US010047726B2

(12) United States Patent
Sakaguchi

(10) Patent No.: US 10,047,726 B2
(45) Date of Patent: Aug. 14, 2018

(54) CONDITION MONITORING SYSTEM AND WIND POWER GENERATION SYSTEM COMPRISING THE SAME

(71) Applicant: NTN Corporation, Osaka-shi, Osaka (JP)

(72) Inventor: Tomoya Sakaguchi, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/329,788

(22) PCT Filed: Jul. 9, 2015

(86) PCT No.: PCT/JP2015/069749
§ 371 (c)(1),
(2) Date: Jan. 27, 2017

(87) PCT Pub. No.: WO2016/017396
PCT Pub. Date: Feb. 4, 2016

(65) Prior Publication Data
US 2017/0234304 A1    Aug. 17, 2017

(30) Foreign Application Priority Data

Jul. 29, 2014  (JP) ................................. 2014-153748
Jul. 29, 2014  (JP) ................................. 2014-153764

(51) Int. Cl.
*F03D 17/00* (2016.01)
*F03D 7/04* (2006.01)
(Continued)

(52) U.S. Cl.
CPC ............. *F03D 17/00* (2016.05); *F03D 7/042* (2013.01); *F03D 9/25* (2016.05); *G01M 15/14* (2013.01); *F05D 2260/80* (2013.01)

(58) Field of Classification Search
CPC .......... F03D 17/00; F03D 80/50; F03D 7/042; G01M 13/04; F05D 2260/80
See application file for complete search history.

(56) References Cited

U.S. PATENT DOCUMENTS 6,525,518 B1    2/2003  Garnaes
7,860,663 B2 *  12/2010  Miyasaka .............. G01H 1/003
                                                      702/113
(Continued)

FOREIGN PATENT DOCUMENTS

EP    2728175 A1    5/2014
JP    07-218333 A   8/1995
(Continued)

OTHER PUBLICATIONS

Search Report issued in corresponding International Patent Application No. PCT/JP2015/069749, dated Oct. 6, 2015.
(Continued)

*Primary Examiner* — Freddie Kirkland, III
(74) *Attorney, Agent, or Firm* — McDermott Will & Emery LLP

(57) ABSTRACT

A condition monitoring system for a wind turbine comprises: a sensor which senses a condition of a yaw bearing; a monitor device which generates a diagnosis parameter based on a detection result of the sensor; a sensor which senses a rotating angular velocity of a nacelle and that of a main shaft; and a data server which diagnoses a failure of the yaw bearing based on the diagnosis parameter. The data server diagnoses whether the yaw bearing has a failure, based on a variation of the diagnosis parameter from an initial value thereof when the nacelle has a rotating angular velocity within a non-zero, first prescribed range and the main shaft has a rotating angular velocity within a second prescribed range.

15 Claims, 10 Drawing Sheets

(51) Int. Cl.
*F03D 9/25* (2016.01)
*G01M 15/14* (2006.01)

(56) References Cited

U.S. PATENT DOCUMENTS

| | | | |
|---|---|---|---|
| 8,249,852 B2 | 8/2012 | Thulke | |
| 9,057,360 B2* | 6/2015 | Tobinaga | F03D 80/50 |
| 9,423,290 B2* | 8/2016 | Sakaguchi | G01H 1/003 |
| 9,458,835 B2* | 10/2016 | Ikeda | F03D 17/00 |
| 9,816,483 B2* | 11/2017 | Nakamura | F03D 7/00 |
| 9,869,298 B2* | 1/2018 | Rosenvard | F03D 7/04 |
| 2005/0276696 A1 | 12/2005 | LeMieux | |
| 2008/0234964 A1 | 9/2008 | Miyasaka et al. | |
| 2011/0162865 A1 | 7/2011 | Ueno et al. | |
| 2012/0139257 A1 | 6/2012 | Tobinaga | |
| 2013/0104930 A1 | 5/2013 | Shih et al. | |
| 2013/0115043 A1 | 5/2013 | Rosenvard et al. | |
| 2013/0214534 A1 | 8/2013 | Nakamura et al. | |
| 2014/0007657 A1 | 1/2014 | Matsubara et al. | |
| 2014/0054894 A1 | 2/2014 | Olesen | |
| 2015/0116131 A1 | 4/2015 | Ikeda et al. | |
| 2017/0241409 A1* | 8/2017 | Kjær | F03D 17/00 |

FOREIGN PATENT DOCUMENTS

| | | |
|---|---|---|
| JP | 2002-509222 A | 3/2002 |
| JP | 2006-105956 A | 4/2006 |
| JP | 2006-275954 A | 10/2006 |
| JP | 2009-216486 A | 9/2009 |
| JP | 2012-122342 A | 6/2012 |
| JP | 2012-181169 A | 9/2012 |
| JP | 2013-170507 A | 9/2013 |
| JP | 2013-185507 A | 9/2013 |
| JP | 2014-010016 A | 1/2014 |
| WO | 2011/121781 A1 | 10/2011 |
| WO | 2013/065323 A1 | 5/2013 |
| WO | 2013/104930 A1 | 7/2013 |

OTHER PUBLICATIONS

Extended Search Report issued in corresponding European Patent Application No. 15826326.9 dated Feb. 13, 2018.
Decision to Grant Patent issued in corresponding Japanese Patent Application No. 2014-153748 dated Mar. 13, 2018 (with English translation).
Office Action issued in corresponding Japanese Patent Application No. 2014-153764, dated Jun. 5, 2018.

* cited by examiner

FIG.3

| COMPONENT | FAILURE MODE | SENSOR | DIAGNOSIS PARAMETER |
|---|---|---|---|
| MAIN SHAFT BEARING | BEARING DAMAGED | VIBRATION (HIGH) | EFFECTIVE VALUE |
| MAIN SHAFT BEARING | UNBALANCE | VIBRATION (LOW) | FIRST-ORDER ROTATIONAL FREQUENCY COMPONENT |
| MAIN SHAFT BEARING | UNBALANCE | VIBRATION (LOW) | SECOND-ORDER ROTATIONAL FREQUENCY COMPONENT |
| MAIN SHAFT BEARING | UNBALANCE | VIBRATION (LOW) | THIRD-ORDER ROTATIONAL FREQUENCY COMPONENT |
| MAIN SHAFT BEARING | MISALIGNMENT | AXIAL VIBRATION (LOW) | FIRST-ORDER ROTATIONAL FREQUENCY COMPONENT |
| MAIN SHAFT BEARING | MISALIGNMENT | AXIAL VIBRATION (LOW) | SECOND-ORDER ROTATIONAL FREQUENCY COMPONENT |
| MAIN SHAFT BEARING | MISALIGNMENT | AXIAL VIBRATION (LOW) | THIRD-ORDER ROTATIONAL FREQUENCY COMPONENT |
| SPEED UP GEAR | BEARING DAMAGED | VIBRATION (HIGH) | EFFECTIVE VALUE |
| SPEED UP GEAR | GEAR DAMAGED | VIBRATION (HIGH) | FIRST-ORDER MESHING FREQUENCY COMPONENT |
| SPEED UP GEAR | GEAR DAMAGED | VIBRATION (HIGH) | SECOND-ORDER MESHING FREQUENCY COMPONENT |
| SPEED UP GEAR | GEAR DAMAGED | VIBRATION (HIGH) | THIRD-ORDER MESHING FREQUENCY COMPONENT |
| POWER GENERATOR | BEARING DAMAGED | VIBRATION (HIGH) | EFFECTIVE VALUE |
| NACELLE | ABNORMAL VIBRATION | VIBRATION (LOW) | LOW FREQUENCY VIBRATIONAL COMPONENT |
| NACELLE | ABNORMAL VIBRATION | AXIAL VIBRATION (LOW) | LOW FREQUENCY VIBRATIONAL COMPONENT |
| YAW BEARING | BEARING DAMAGED | VIBRATION (HIGH) | EFFECTIVE VALUE |

VIBRATION (HIGH): RADIALLY ATTACHED HIGH FREQUENCY VIBRATION SENSOR
VIBRATION (LOW): RADIALLY ATTACHED LOW FREQUENCY VIBRATION SENSOR
AXIAL VIBRATION (LOW): AXIALLY ATTACHED LOW FREQUENCY VIBRATION SENSOR

CONDITION MONITORING SYSTEM AND WIND POWER GENERATION SYSTEM COMPRISING THE SAME

CROSS REFERENCE

This application is the U.S. National Phase under 35 U.S.C. § 371 of International Application No. PCT/JP2015/069749, filed on Jul. 9, 2015, which claims the benefit of Japanese Application No. 2014-153748, filed on Jul. 29, 2014, and Japanese Application No. 2014-153764, filed on Jul. 29, 2014, the entire contents of each are hereby incorporated by reference.

TECHNICAL FIELD

The present invention relates to a condition monitoring system and a wind power generation system comprising the same, and particularly to a condition monitoring system provided for a wind turbine comprising a yaw bearing which supports a nacelle on top of a tower turnably and a wind power generation system comprising the same.

BACKGROUND ART

Japanese Patent Laying-Open No. 2013-185507 (patent document 1) discloses a condition monitoring system (CMS) which monitors a condition of a mechanical element of a wind turbine. This condition monitoring system takes in a signal of a vibration sensor provided to the mechanical element, records over a long period of time how a quantity of a condition representing a state of vibration in a rated operation (hereafter referred to as a diagnosis parameter) varies with time, and based on the diagnosis parameter's increase rate, a feature of the variation and the like, determines whether the mechanical element has a failure (see patent document 1).

Furthermore, a wind turbine generally includes a nacelle provided on top of a tower and a yaw bearing which supports the nacelle on top of the tower turnably. The yaw bearing is provided at a high place and generally has a large size, and accordingly it is not easy to replace it with another. Japanese Patent Laying-Open No. 2012-122342 (patent document 2) describes a wind turbine allowing a simple device to be used to replace a yaw bearing with another (see patent document 2).

CITATION LIST

Patent Documents

Patent document 1: Japanese Patent Laying-Open No. 2013-185507
Patent document 2: Japanese Patent Laying-Open No. 2012-122342

SUMMARY OF INVENTION

Technical Problem

In the above patent document 1, monitoring the condition of the yaw bearing is not discussed. Whether the yaw bearing has a failure can be confirmed for example by detecting an operation of the real machine in response to a command to turn the nacelle, however, with this method, the failure cannot be detected until the yaw bearing is damaged and accordingly, the nacelle's rotation torque increases, and at a drive motor, torque is insufficient.

Furthermore, although the above patent document 2 is useful in allowing a simple device to be used to replace the yaw bearing having a failure, the document does not discuss detecting the failure of the yaw bearing in particular. When the yaw bearing is to be replaced, procuring a replacement yaw bearing requires an adequate period of time, and also in this regard, early detecting the failure of the yaw bearing is desired.

The present invention has been made to overcome such an issue, and an object of the present invention is to provide a condition monitoring system capable of early detecting a failure of a yaw bearing and a wind power generation system including the same.

Solution to Problem

According to the present invention, a condition monitoring system is a condition monitoring system which monitors a condition of equipment included in a wind turbine. The wind turbine includes: a blade for converting wind power to rotation torque; a main shaft which receives the rotation torque; a power generator which converts the rotation torque into electric power; a nacelle which is provided on top of a tower and houses the main shaft and the power generator therein; and a yaw bearing which turnably supports the nacelle on the top of the tower. The condition monitoring system comprises: a first detector configured to detect the condition of the equipment; a monitor device configured to generate a diagnosis parameter based on a detection result of the first detector; a controller configured to diagnose a failure of the equipment based on the diagnosis parameter; a second detector configured to detect a rotation speed of the nacelle; and a third detector configured to detect a rotation speed of the main shaft. And the controller is configured to diagnose whether the yaw bearing has a failure, based on a variation of the diagnosis parameter from an initial value thereof when the nacelle has a rotation speed within a first prescribed range excluding zero and when the main shaft has a rotation speed within a second prescribed range.

In the present invention, whether the yaw bearing has a failure is diagnosed, based on a diagnosis parameter obtained when the nacelle has a rotation speed within a non-zero, first prescribed range and the main shaft has a rotation speed within a second prescribed range, and accordingly an effect of the rotation of the main shaft on the diagnosis parameter used in diagnosing the failure of the yaw bearing can be suppressed. And whether the yaw bearing has a failure is diagnosed based on a variation of the diagnosis parameter from an initial value thereof, and accordingly the failure of the yaw bearing can be detected before the nacelle turns abnormally. Thus, according to the present invention, the failure of the yaw bearing can be early detected.

Note that the rotation speed of the nacelle indicates the speed of the rotation of the nacelle, and includes both a number of rotations per unit time and a rotation angle per unit time. Similarly, the rotation speed of the main shaft indicates the speed of the rotation of the main shaft, and includes both a number of rotations per unit time and a rotation angle per unit time.

Preferably the controller is configured to diagnose whether the yaw bearing has a failure, based on a variation of the diagnosis parameter from an initial value thereof when the nacelle has a rotation speed within the first prescribed range and when the main shaft has a rotation speed of substantially zero.

Preferably, the controller is further configured to: (1) correct the diagnosis parameter based on a detection result of the third detector obtained when the nacelle has a rotation speed within a first prescribed range, and (ii) diagnose whether the yaw bearing has a failure based on a variation of the corrected diagnosis parameter from an initial value thereof.

In the present invention, since a diagnosis parameter is corrected based on a detection result of the third detector which detects the rotation speed of the main shaft, an increase of a variation of the diagnosis parameter that is introduced as the main shaft rotates can be suppressed. Thus, there is not caused a delay or the like in detecting a failure of equipment, that is introduced for example by making unnecessarily large a setting of a threshold value used in diagnosing whether the yaw bearing has a failure. Furthermore, however the main shaft may rotate, a diagnosis parameter can be collected and a failure can be detected, so that, when compared with a case where a failure is sensed based on a diagnosis parameter obtained when the main shaft has a rotation speed within a prescribed range, the failure can be early detected. Thus, according to the present invention, a failure of a yaw bearing can be early detected.

Preferably, the controller is configured to correct the diagnosis parameter by using a first correction function with a rotation speed of the main shaft used as a variable. The first correction function is a function which corrects the diagnosis parameter so that as the main shaft has a higher rotation speed, a ratio of the diagnosis parameter after the correction to the diagnosis parameter before the correction is smaller.

Still preferably, the first correction function is a function of a dimensionless diagnosis parameter obtained by dividing the diagnosis parameter by a diagnosis parameter obtained while the main shaft does not rotate. The first correction function uses as the variable a dimensionless rotation speed of the main shaft obtained by dividing a rotation speed of the main shaft by a maximum speed thereof.

Preferably, the controller is configured to calculate an average value of a rotation speed of the main shaft in a prescribed period before the diagnosis, and correct the diagnosis parameter using the first correction function based on the average value.

Preferably, the controller is further configured to correct the diagnosis parameter by using a second correction function using as a variable an amount of electric power generated by the power generator. The second correction function is a function which corrects the diagnosis parameter so that as the power generator generates a larger amount of electric power, a ratio of the diagnosis parameter after the correction by the second correction function to the diagnosis parameter before the correction is smaller.

Still preferably, only when a rotation speed of the main shaft reaches an upper limit, the controller is further configured to correct the diagnosis parameter by using the second correction function.

Preferably, the first detector is provided in a vicinity of the yaw bearing and detects a condition of the yaw bearing.

Preferably, the controller is configured to diagnose the failure of the equipment, based on a diagnosis parameter obtained when a rotation speed of the nacelle obtained from information from SCADA (Supervisory Control and Data Acquisition) separately monitoring the wind turbine falls within a first prescribed range.

Preferably, the second detector includes an azimuth sensor.

Furthermore, preferably, the second detector includes a gyro sensor.

Furthermore, preferably, the second detector includes a GPS (Global Positioning System).

Furthermore, preferably, the second detector includes a detector to detect at least one of a driving current and a driving voltage of a drive device driving the nacelle.

Furthermore, according to the present invention, a wind power generation system includes a wind turbine and any condition monitoring system described above.

Advantageous Effects of Invention

According to the present invention, a failure of a yaw bearing which supports a nacelle on top of a tower turnably can early be detected.

BRIEF DESCRIPTION OF DRAWINGS

FIG. 3 is a figure for illustrating a relationship of a sensor shown in FIG. 2 and a diagnosis parameter.

DESCRIPTION OF EMBODIMENTS

The present invention will now be described in embodiments hereinafter in detail with reference to the drawings. Hereinafter, while a plurality of embodiments will be described, combining a configuration described in each embodiment, as appropriate, has been planned since the application was initially filed. In the figures, identical or corresponding components are identically denoted and will not be described repeatedly.

First Embodiment

<General Configuration of Condition Monitoring System>

Figure 1:
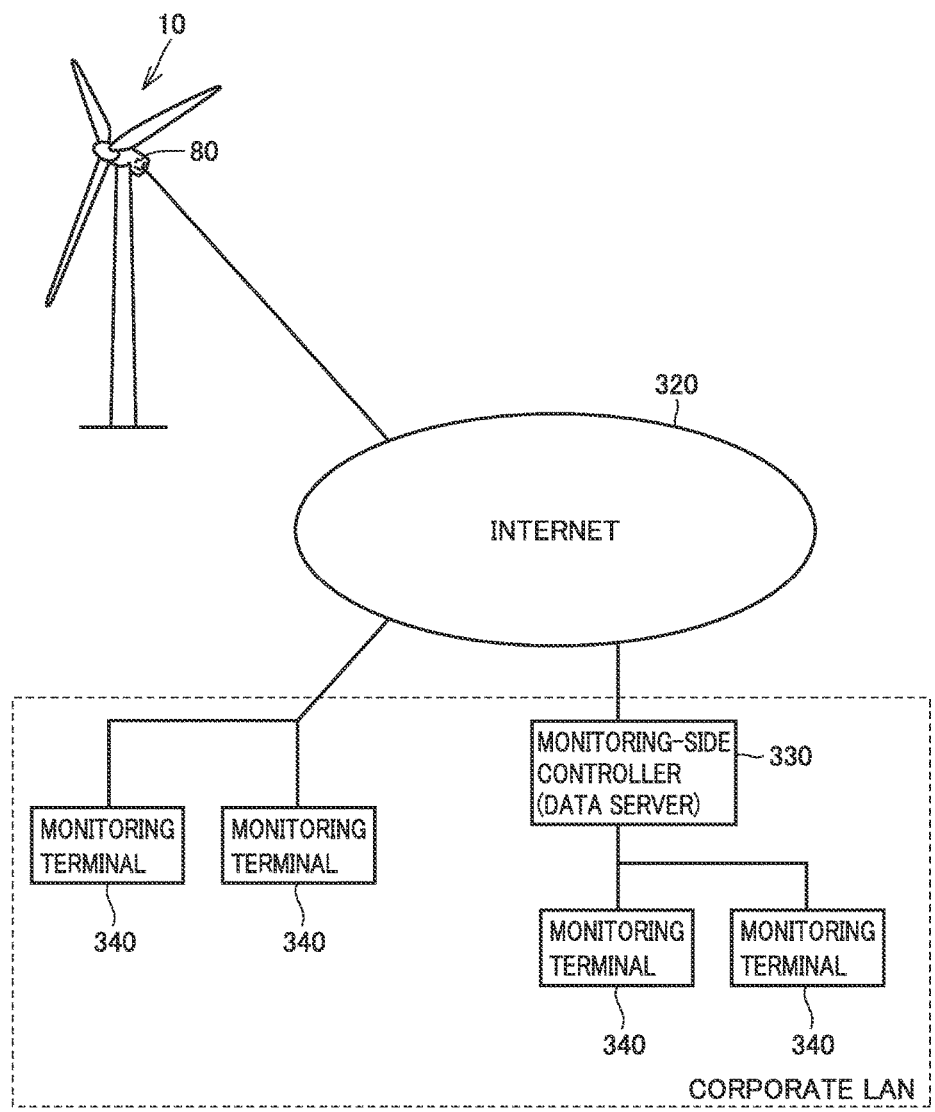
FIG. 1 is a block diagram showing a general configuration of a condition monitoring system according to a first embodiment of the present invention.

FIG. 1 schematically shows a general configuration of a condition monitoring system according to a first embodiment. With reference to FIG. 1, the condition monitoring system includes a monitor device 80, a data server (a monitoring-side controller) 330, and a monitoring terminal 340.

Monitor device 80 calculates an effective value, a peak value, a crest factor, an effective value after an envelope process, a peak value after the envelope process, etc. from values sensed by sensors 70A-70I (see FIG. 2) described later, and transmits them to data server 330 via Internet 320. Furthermore, monitor device 80 transmits a measured value of a rotating angular velocity of the main shaft of wind turbine 10 and that of a rotating angular velocity of the nacelle thereof to data server 330 via Internet 320. Monitor device 80 and data server 330 may communicate via a wire or may communicate wirelessly.

Data server 330 and monitoring terminal 340 are connected via a corporate LAN (Local Area Network), for example. Monitoring terminal 340 is provided to view measurement data received by data server 330, conduct a detailed analysis of the measurement data, change a setting of monitor device 80, display a condition of each equipment of wind turbine 10, and the like.

<Configuration of Wind Turbine>

Figure 2:
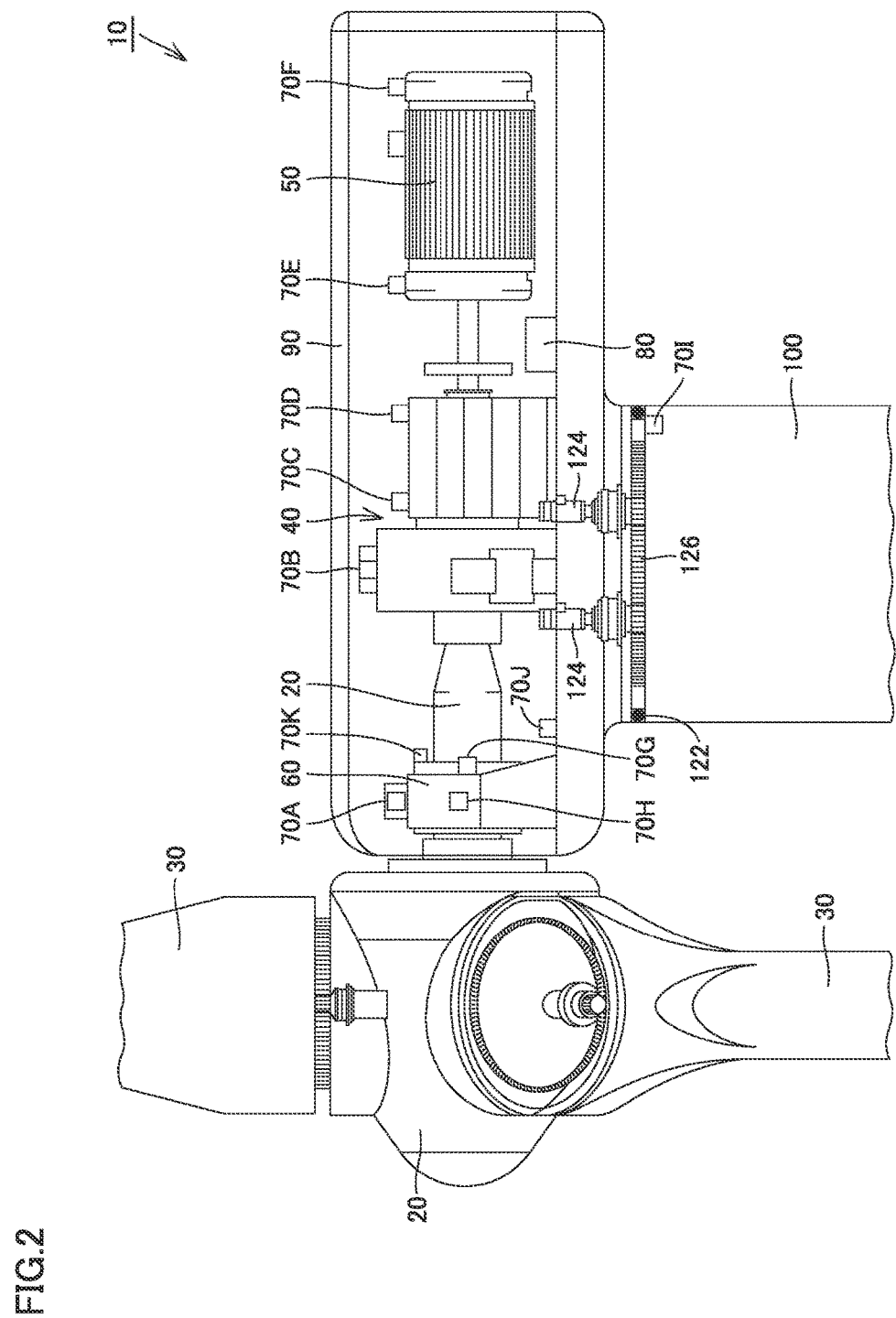
FIG. 2 shows a main portion of a wind turbine shown in FIG. 1.

FIG. 2 is a diagram schematically showing a configuration of wind turbine 10. With reference to FIG. 2, wind turbine 10 includes a main shaft 20, a blade 30, a speed up gear 40, a power generator 50, a main shaft bearing 60, a nacelle 90, and a tower 100. Furthermore, wind turbine 10 includes sensors 70A-70I, rotation angle sensors 70J and 70K, and monitor device 80. Main shaft 20, speed up gear 40, power generator 50, main shaft bearing 60, monitor device 80 and the like are housed in nacelle 90, and nacelle 90 is supported by tower 100.

Main shaft 20 is inserted into nacelle 90, connected to the input shaft of speed up gear 40, and is rotatably supported by main shaft bearing 60. And main shaft 20 transmits rotation torque that is generated by blade 30 receiving wind power to the input shaft of speed up gear 40. Blade 30 is provided at an end of main shaft 20, converts wind power into rotation torque, and transmits it to main shaft 20.

Main shaft bearing 60 is disposed in nacelle 90 in a fixed manner and rotatably supports main shaft 20. Main shaft bearing 60 is a rolling bearing, and for example, it is a self-centering roller bearing, a conical roller bearing, a cylindrical roller bearing, a ball bearing, etc. Note that these bearings may be of a single row or double rows.

Sensors 70A-70H are disposed at each equipment in nacelle 90 in a fixed manner. Specifically, sensor 70A is disposed on an upper surface of main shaft bearing 60 in a fixed manner and monitors a condition of main shaft bearing 60. Sensors 70B-70D are disposed on an upper surface of speed up gear 40 in a fixed manner, and monitor a condition of speed up gear 40. Sensors 70E and 70F are disposed on an upper surface of power generator 50 in a fixed manner, and monitor a condition of power generator 50. Sensor 70G is disposed at main shaft bearing 60 in a fixed manner, and monitors misalignment, and abnormal vibration of nacelle 90. Sensor 70H is disposed at main shaft bearing 60 in a fixed manner, and monitors unbalance, and abnormal vibration of the nacelle.

Sensor 70J is disposed on a floor of nacelle 90, and senses a rotating angular velocity of nacelle 90, which may be a rotation speed thereof per unit time. Sensor 70J includes a gyro sensor which vibrates an element and senses angular velocity from Coriolis force exerted to the element, for example.

Sensor 70K is provided adjacent to main shaft 20 and senses a rotating angular velocity of main shaft 20, which may be a rotation speed thereof per unit time. For sensor 70K, a known rotational speed sensor can be used, such as an encoder, a proximity sensor, an optical sensor, and a resolver. Note that the rotating angular velocity of main shaft 20 may be calculated from a rotating angular velocity of power generator 50, which is detectable by a resolver or the like, and a gear ratio of speed up gear 40.

Speed up gear 40 is provided between main shaft 20 and power generator 50, accelerates the rotation speed of main shaft 20, and outputs it to power generator 50. As an example, speed up gear 40 is composed of a gear speed-up mechanism including a planetary gear, a countershaft, a high speed shaft, etc. Note that although not shown in the figure, speed up gear 40 is also provided therein with a plurality of bearings which support a plurality of shafts rotatably. Power generator 50 is connected to the output shaft of speed up gear 40, and generates electric power by the rotation torque received from speed up gear 40. Power generator 50 is an induction generator, for example. Note that power generator 50 is also provided therein with a bearing to support a rotor rotatably.

A nacelle rotation mechanism includes a drive device 124 attached on the side of nacelle 90 for changing the nacelle in direction, a ring gear 126 rotated by a pinion gear fitted on a rotation shaft of drive device 124, and a bearing 122. Ring gear 126 is fixed to tower 100 and thus attached.

Bearing 122 is provided at a boundary of nacelle 90 and tower 100 and supports nacelle 90 turnably. The nacelle rotation mechanism allows nacelle 90 to rotate about the rotation axis of bearing 122. The rotation of nacelle 90 on tower 100 is referred to as a yaw movement or yawing. Hereinafter, bearing 122 is also referred to as yaw bearing 122. And sensor 70I is attached to a race of yaw bearing 122 or a component in direct contact therewith and monitors the condition of yaw bearing 122.

Monitor device 80 is provided inside nacelle 90, and receives data of each equipment's vibration or sound and AE (acoustic emission) sensed by sensors 70A-70I, a rotating angular velocity of nacelle 90 sensed by sensor 70J, a rotating angular velocity of main shaft 20 sensed by sensor 70K, and the like. Note that although not shown in the figure, sensors 70A-70K and monitor device 80 are connected by a cable.

Monitoring terminal 340 has a program previously stored therein to at least view measurement data stored in data server 330, conduct a detailed analysis of the measurement data, change a setting of monitor device 80, and display a condition of each equipment of wind turbine 10. On a screen of monitoring terminal 340, data about each equipment of wind turbine 10 is displayed which is useful for an expert of wind turbine 10 to make a decision.

<Relationship Between Diagnosis Parameter and Failure Mode>

FIG. 3 is a figure for illustrating a relationship of a variety of types of data used in the first embodiment. FIG. 3 shows a relationship between a portion (or component) of wind turbine 10, a failure mode, a sensor, and a diagnosis parameter calculated from the sensor's measurement data.

Specifically, as shown in FIG. 2 and FIG. 3, for main shaft bearing 60, data measured by a high frequency vibration sensor 70A provided to main shaft bearing 60 is used to allow monitor device 80 to calculate an effective value as a diagnosis parameter, and when the calculated effective value exceeds a corresponding threshold value, monitoring terminal 340 displays that main shaft bearing 60 has a damage.

Furthermore, for main shaft bearing 60, data measured by a low frequency vibration sensor 70H provided to measure radial vibration of main shaft bearing 60 is used to allow monitor device 80 to calculate a first-order rotational frequency component, a second-order rotational frequency component, and a third-order rotational frequency component as a diagnosis parameter, and when each calculated value exceeds a corresponding threshold value, monitoring terminal 340 displays that main shaft bearing 60 is unbalanced.

Furthermore, for main shaft bearing 60, data measured by a low frequency vibration sensor 70G provided to measure axial vibration of main shaft 20 is used to allow monitor device 80 to calculate a first-order rotational frequency component, a second-order rotational frequency component and a third-order rotational frequency component as a diagnosis parameter, and when each calculated value exceeds a corresponding threshold value, monitoring terminal 340 displays that main shaft bearing 60 is misaligned.

For speed up gear 40, data measured by high frequency vibration sensors 70B-70D is used to allow monitor device 80 to calculate an effective value as a diagnosis parameter, and when the calculated effective value exceeds a corresponding threshold value, monitoring terminal 340 displays that speed up gear 40 has a bearing damaged.

Furthermore, for speed up gear 40, data measured by high frequency vibration sensors 70B-70D is used to allow monitor device 80 to calculate a gear's first-order meshing frequency component, second-order meshing frequency component and third-order meshing frequency component as a diagnosis parameter, and when each calculated value exceeds a corresponding threshold value, monitoring terminal 340 displays that speed up gear 40 has the gear damaged.

For power generator 50, data measured by high frequency vibration sensors 70E and 70F is used to allow monitor device 80 to calculate an effective value as a diagnosis parameter, and when the calculated effective value exceeds a corresponding threshold value, monitoring terminal 340 displays that power generator 50 has a bearing damaged.

For nacelle 90, data measured by a low frequency vibration sensor 70H provided to measure radial vibration of main shaft 20 is used to allow monitor device 80 to calculate a low frequency vibrational component as a diagnosis parameter, and when the calculated value exceeds a corresponding threshold value, monitoring terminal 340 displays that nacelle 90 abnormally vibrates.

Furthermore, for nacelle 90, data measured by low frequency vibration sensor 70G provided to measure axial vibration of main shaft 20 is used to allow monitor device 80 to calculate a low frequency vibrational component as a diagnosis parameter, and when the calculated value exceeds a corresponding threshold value, monitoring terminal 340 displays that nacelle 90 abnormally vibrates.

For yaw bearing 122, data measured by a high frequency vibration sensor 70I attached to the race of yaw bearing 122 or the component in direct contact therewith is used to allow monitor device 80 to calculate an effective value as a diagnosis parameter, and when the calculated effective value exceeds a corresponding threshold value, monitoring terminal 340 displays that yaw bearing 122 has a damage.

Thus, in this condition monitoring system, a failure of yaw bearing 122 is diagnosed based on a diagnosis parameter calculated from the measurement data of sensor 70I. Note that the measurement data of sensor 70I varies depending on the rotation of nacelle 90 and the rotation of main shaft 20, and in the condition monitoring system according to the first embodiment, rotation angle sensor 70J senses a rotating angular velocity ω (rad/s) of nacelle 90 and rotation angle sensor 70K senses a rotating angular velocity ωm (rad/s) of main shaft 20. And a period of time for which nacelle 90 has rotating angular velocity ω in a non-zero, first prescribed range and main shaft 20 has rotating angular velocity ωm of substantially 0 (i.e., main shaft 20 is stopped from rotating) is defined as an effective period of a diagnosis parameter for diagnosing the yaw bearing, and a failure of yaw bearing 122 is diagnosed based on the diagnosis parameter of this effective period.

Note that the above measurement items are partially extracted for ease of understanding, and are not exclusive. Measurement data of a vibration sensor, an AE sensor, a temperature sensor, and a sound sensor may be used to calculate an effective value, a peak value, an average value, a crest factor, an effective value after an envelope process, and a peak value after the envelope process by using a statistical method, and the calculated values may be compared with corresponding threshold values to understand a condition of equipment of wind turbine 10, and the equipment's condition may be displayed on monitoring terminal 340.

<Operation of Condition Monitoring System>

Regarding the condition monitoring system according to the first embodiment, an operation in a case where a failure of yaw bearing 122 is diagnosed will be described hereafter. The condition monitoring system includes a process in a basic data collecting period for setting a diagnostic operating condition of wind turbine 10 (see FIG. 4), a process in a learning period after the basic data collecting period to generate a threshold value used in determining whether operation measurement data which satisfies the diagnostic operating condition is abnormal or not (see FIG. 5), and a process in a service period after the learning period to actually operate wind turbine 10 in service and use the threshold value generated in the learning period to monitor a condition of wind turbine 10 (see FIG. 6).

(Process in Basic Data Collecting Period)

The basic data collecting period is a period to collect basic data required in determining a diagnostic operating condition of wind turbine 10. A process done in the basic data collecting period will be described.

Figure 4:
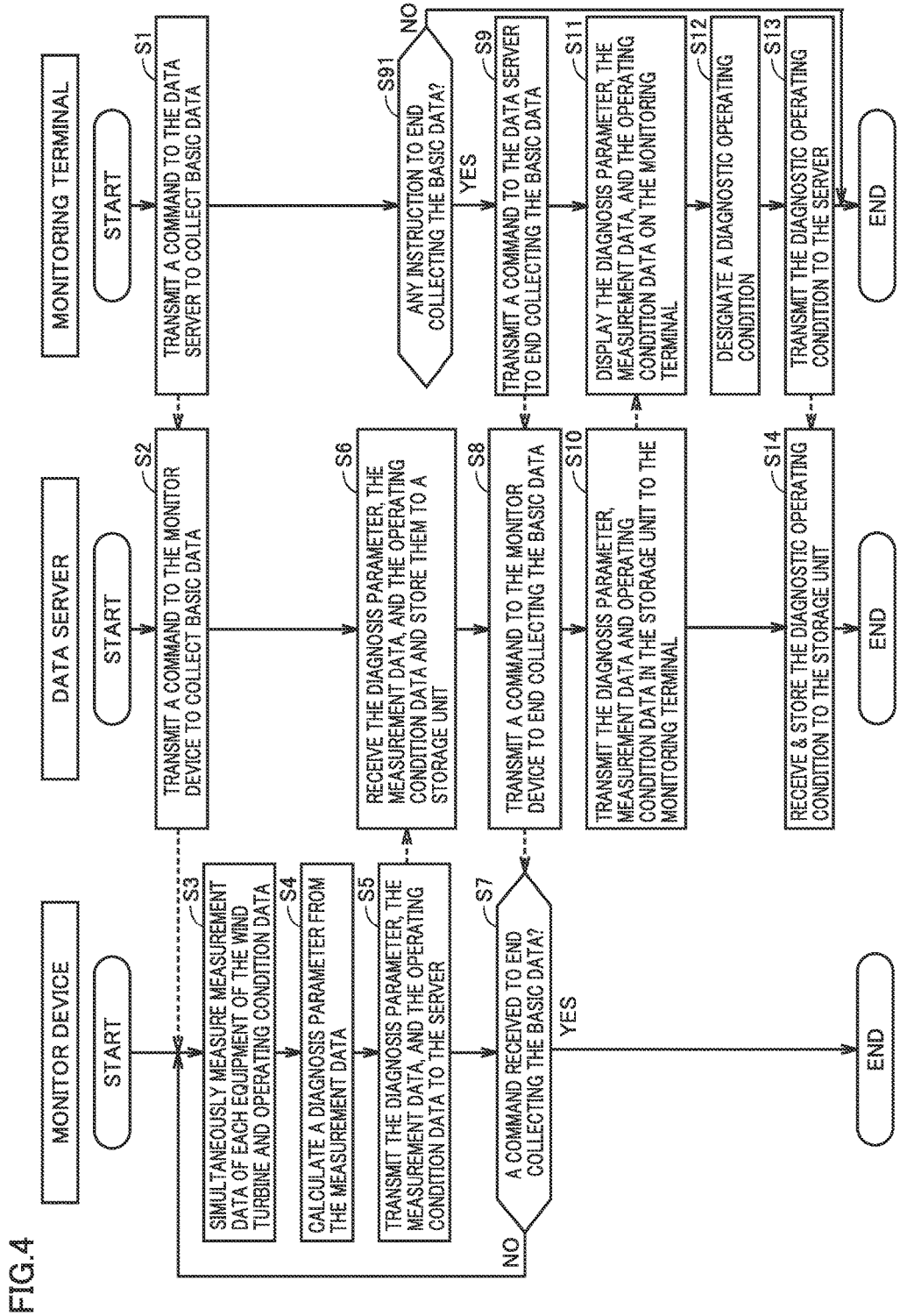
FIG. 4 is a flowchart which represents an operation of the condition monitoring system shown in FIG. 1 during a basic data collecting period.

FIG. 4 is a flowchart for illustrating the process in the basic data collecting period. With reference to FIG. 4, when an operation of wind turbine 10 is started and a person in charge operates monitoring terminal 340 to transmit a command to data server 330 to collect basic data (step S1), the command to collect the basic data is transmitted via data server 330 to monitor device 80 (step S2). Monitor device 80 receives the command to collect the basic data, and in response, collects a variety of types of data such as vibration of each equipment of wind turbine 10 (hereinafter referred to as measurement data) and a variety of types of data such as rotating angular velocity ωm of main shaft 20, rotating angular velocity ω of nacelle 90, and a generated current (hereinafter referred to as operating condition data) simultaneously (Step S3), calculates a diagnosis parameter from the measurement data which is the variety of types of data such as vibration (step S4), and transmits the diagnosis parameter, the measurement data, and the operating condition data to data server 330 (step S5).

Data server 330 receives the diagnosis parameter, the measurement data and the operating condition data from monitor device 80, and stores them to a storage unit (step S6). This process of the measurement of the measurement data and the operating condition data (step S3), the calculation of the diagnosis parameter (step S4), the transmission to data server 330 (step S5), and the storage to the storage unit in data server 330 (step S6) is continued until step S7 where monitor device 80 receives a command from monitoring terminal 340 to end collecting the basic data (step S7; NO).

Note that the operating condition data is not limited to the rotating angular velocity and the generated current, and also includes a physical quantity characterizing an operational condition of wind turbines 10, such as wind speed, torque of a shaft of the power generator, etc. Furthermore, the measurement data is not limited to vibration, and also includes a physical quantity which represents a condition of equipments, such as AE, temperature, and sound.

When the person in charge operates monitoring terminal 340 to issue an instruction to end collecting the basic data (step S91; YES) a command to end collecting the basic data is transmitted from monitoring terminal 340 to data server 330 (step S9). In response, as has been described above, monitor device 80 ends collecting the basic data, and the process ends (step S7; YES). Simultaneously, data server 330 transmits all of the diagnosis parameter, measurement data and operating condition data collected during the basic data collecting period to monitoring terminal 340 (step S10). Note that when the person in charge does not issue an instruction via monitoring terminal 340 to end collecting the basic data, (step S91; NO), the process ends as it is.

Monitoring terminal 340 displays the diagnosis parameter, the measurement data, and the operating condition data (step S11), and the person in charge sees the diagnosis parameter and the operating condition data and designates a diagnostic operating condition (step S12). Note that the diagnostic operating condition is an operating condition under which the condition monitoring system conducts a diagnosis. Herein, yaw bearing 122 is designated as a target to be diagnosed, and the diagnostic operating condition (a yaw bearing diagnosing, operating condition) is designated such that main shaft 20 is stopped from rotating and nacelle 90 has rotating angular velocity ω within a prescribed range. The prescribed range of rotating angular velocity ω of nacelle 90 may be selected to be a range in which rotating angular velocity ω is frequently attained in a state where main shaft 20 is stopped from rotating and nacelle 90 is rotating. In a subsequent service period, which will be described later, operating condition data is measured based on this diagnostic operating condition, and when main shaft 20 is stopped from rotating and nacelle 90 has rotating angular velocity ω within the prescribed range, the operating condition satisfies the diagnostic operating condition, and accordingly, a diagnosis parameter is calculated from the simultaneously measured measurement data of sensor 70I, and the diagnosis parameter can be compared with a corresponding threshold value to allow a failure to be early detected. Note that when the operating condition does not satisfy the diagnostic operating condition, whether yaw bearing 122 has a failure is not diagnosed. Note that a plurality of diagnostic operating conditions can be designated.

In monitoring terminal 340, the designated diagnostic operating condition (the yaw bearing diagnosing, operating condition) is transmitted to data server 330 (step S13), and data server 330 stores the diagnostic operating condition to the storage unit (step S14). Thus, a process in monitoring terminal 340 and data server 330 in the basic data collecting period ends.

(Process in Learning Period)

The learning period is a period in which after the basic data collecting period required in determining the diagnostic operating condition of wind turbine 10, as has been described above, has elapsed, a threshold value for determining a condition of yaw bearing 122 of wind turbine 10 is generated. A process in this learning period will be described.

Figure 5:
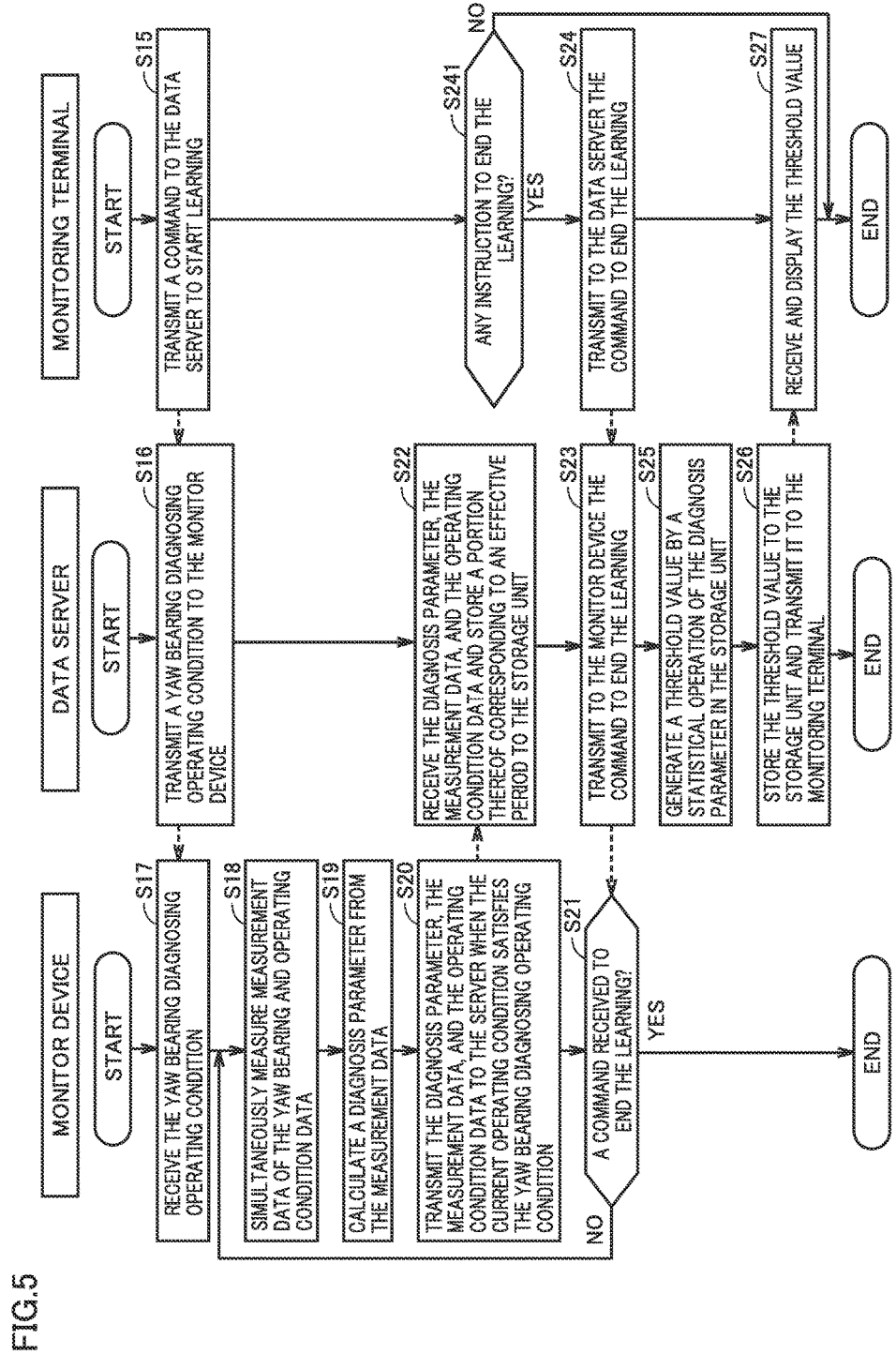
FIG. 5 is a flowchart which represents an operation of the condition monitoring system shown in FIG. 1 during a learning period.

FIG. 5 is a flowchart for illustrating a process in the learning period of wind turbine 10. With reference to FIG. 5, when the person in charge operates monitoring terminal 340 to issue an instruction to start the learning, a command to start the learning is transmitted from monitoring terminal 340 to data server 330 (step S15). Data server 330 receives the command to start the learning, and in response, reads a yaw bearing diagnosing, operating condition stored in the storage unit and transmits it to monitor device 80 (step S16). Monitor device 80 receives the yaw bearing diagnosing, operating condition (step S17), and in response, measures measurement data of yaw bearing 122 and operating condition data simultaneously (step S18). And monitor device 80 calculates a diagnosis parameter from the measurement data of yaw bearing 122 (step S19).

When the current operating condition satisfies the yaw bearing diagnosing, operating condition, monitor device 80 transmits the diagnosis parameter, the measurement data, and the operating condition data to data server 330 (step S20). Data server 330 receives the diagnosis parameter, the measurement data, and the operating condition data, and stores each data thereof for the effective period to the storage unit (step S22). Herein, the effective period is a period in which nacelle 90 has rotating angular velocity ω within a prescribed range and main shaft 20 is stopped from rotating. This process of the measurement of the measurement data and the operating condition data (step S18), the calculation of the diagnosis parameter (step S19), the transmission to data server 330 (step S20), and the storage to the storage unit in data server 330 (step S22) is continued until step S21 where monitor device 80 receives a command from monitoring terminal 340 to end the learning (step S21; NO).

When the person in charge operates monitoring terminal 340 to issue an instruction to end the learning (step S241; YES) a command to end the learning is transmitted from monitoring terminal 340 to data server 330 (step S24). Data server 330 transmits the command to monitor device 80 to end the learning (step S23), and monitor device 80 ends collecting the measurement data and the operating condition data, and the process ends (step S21; YES).

Simultaneously, by a statistical operation of the diagnosis parameter for the effective period stored in the storage unit, data server 330 automatically generates a threshold value for the diagnosis parameter for diagnosing a failure of the yaw bearing (step S25). The threshold value is stored to the storage unit of data server 330, and transmitted to monitoring terminal 340 (step S26). Monitoring terminal 340 receives the threshold value and displays it on a display unit of a monitor or the like (step S27), and the person in charge can confirm the threshold value. Thus, a process in data server 330 and monitor device 80 in the learning period ends. Note that when the person in charge does not issue an instruction via monitoring terminal 340 to end the learning, (step S241; NO), the process ends as it is.

Note that the basic data collecting and learning periods for generating a threshold value can be changed as desired.

The threshold value for determining whether yaw bearings 122 has a failure is generated using a diagnosis parameter obtained when yaw bearing 122 is in a normal condition. Here, for ease of understanding, as a specific example, a case will more specifically be described hereinafter in which a two-stage threshold value is generated for yaw bearing 122.

It is assumed that in step S22, the diagnosis parameter has a plurality of values stored in the storage unit, and the plurality of diagnosis parameters have an average value $\mu_0$ and a standard deviation $\sigma_0$. For example, a first threshold value CT is assumed to be $\mu_0+3\sigma_0$, and a second threshold value WN is assumed to be 3 times of the first threshold value. First threshold value CT and second threshold value WN are represented by the following expressions (1) and (2), respectively:

$$CT = \mu_0 + 3\sigma_0 \quad (5); \text{ and}$$

$$WN = 3(\mu_0 + 3\sigma_0) \quad (6).$$

Using threshold values CT and WN, and based on a diagnosis parameter of a service period described later, data server 330 determines whether yaw bearing 122 has a failure and a result thereof is displayed on monitoring terminal 340. For example, when the diagnosis parameter has a value exceeding threshold value CT, monitoring terminal 340 displays an indication such as "caution" to indicate that yaw bearing 122 is in an abnormal condition. Furthermore, when the diagnosis parameter has a value exceeding threshold value WN, monitoring terminal 340 displays an indication such as "warning" to indicate that yaw bearing 122 is in a condition with a failure having a large extent.

The threshold value divided into two stages allows a classification to be easily done such that, for a measured diagnosis parameter smaller than threshold value CT, an expert's decision is not required, whereas for a measured diagnosis parameter larger than threshold value WN, it is necessary for the expert to carefully determine the condition of yaw bearing 122, and when a diagnosis parameter falls between threshold value CT and threshold value WN, for example, whether to have the expert make a diagnosis can be determined while the condition of yaw bearing 122 is observed. Such a configuration can dispense with a resident expert and thus reduce cost.

Note that while in the above the threshold value is described as having a level divided into two stages, the threshold value's level is not limited thereto and may have more levels.

(Process in Service Period)

The service period is a period in which after the learning period has elapsed, wind turbine 10 is actually operated in service and a threshold value generated in the learning period is used to monitor a condition of yaw bearing 122. A process in the service period will be described.

Figure 6:
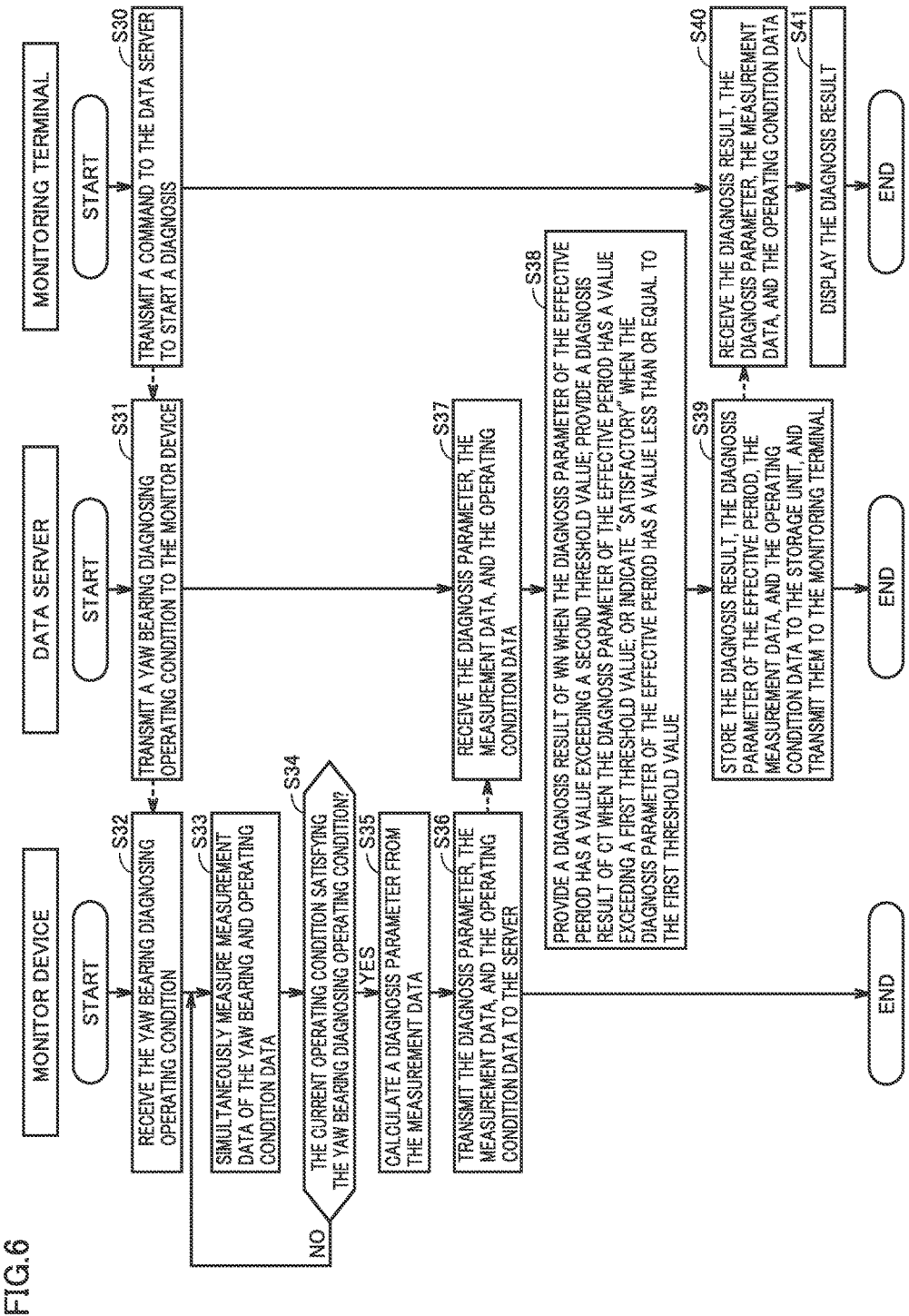
FIG. 6 is a flowchart which represents an operation of the condition monitoring system shown in FIG. 1 during a service period.

FIG. 6 is a flowchart for illustrating the process in the service period. With reference to FIG. 6, from monitoring terminal 340, a person in charge transmits to data server 330 a command to start a diagnosis of a condition of yaw bearing 122 (a command to start a diagnosis) (step S30). Data server 330 receives the command to start the diagnosis, and transmits a yaw bearing diagnosing, operating condition to monitor device 80 (step S31).

Monitor device 80 receives the yaw bearing diagnosing, operating condition (step S32), and in response, measures measurement data of yaw bearing 122 and operating condition data simultaneously (step S33).

Monitor device 80 then determines whether the current operating condition satisfies the yaw bearing diagnosing, operating condition (step S34). If the condition is satisfied (step S34; YES), monitor device 80 calculates a diagnosis parameter from the measurement data of yaw bearing 122 (step S35), and transmits the diagnosis parameter, the measurement data, and the operating condition data to data server 330 (step S36). In contrast, if the condition is not satisfied (step S34; NO) the control returns to step S33 to again measure the measurement data and the operating condition data.

Thus, only when the current operating condition satisfies the yaw bearing diagnosing, operating condition, monitor device 80 transmits the diagnosis parameter, the measurement data, and the operating condition data to data server 330.

Data server 330 receives the diagnosis parameter, the measurement data, and the operating condition data (step S37), and determines the condition of yaw bearing 122 based on a received diagnosis parameter that is obtained in the effective period and a threshold value generated during the learning period. For example, when a diagnosis parameter of the effective period exceeds second threshold value WN, data server 330 provides a diagnosis result of WN, whereas when the diagnosis parameter of the effective period exceeds first threshold value CT, data server 330 provides a diagnosis result of CT. And data server 330 stores this diagnosis result, the diagnosis parameter of the effective period, the measurement data, and the operating condition data to the storage unit, and transmits these pieces of data to monitoring terminal 340 (step S39).

Monitoring terminal 340 receives the diagnosis result, the diagnosis parameter, the measurement data, and the operating condition data (step S40), and displays the diagnosis result of yaw bearing 122. When the diagnosis result is WN, "warning" is displayed, whereas when the diagnosis result is CT, "caution" is displayed, otherwise "satisfactory" is displayed (step S41).

Note that when the diagnosis result is WN or CT, an e-mail can be transmitted to the person in charge to ensure that he/she is informed of an abnormal condition.

When wind turbine 10 is operated in a different method, it is necessary to change a diagnostic operating condition, a threshold value, etc. Such a case can also be handled by following the procedure of FIG. 4 from step S1 to change the diagnostic operating condition to set a new threshold value. Note that the threshold value can be changed by the person in charge via monitoring terminal 340.

Note that since in step S40 of FIG. 6 monitoring terminal 340 receives a diagnosis result and together therewith a diagnosis parameter and measurement data, monitoring terminal 340 can easily provide an expert with the latest and optimal measurement data etc. which can be assessed and analyzed by the expert, and furthermore, monitoring terminal 340 can provide an environment allowing the measurement data etc. and data associated therewith to be simultaneously displayed on a monitor (not shown). Accordingly, the expert can easily determine, based on an image on the monitor, whether a detailed diagnosis is required.

Figure 7:
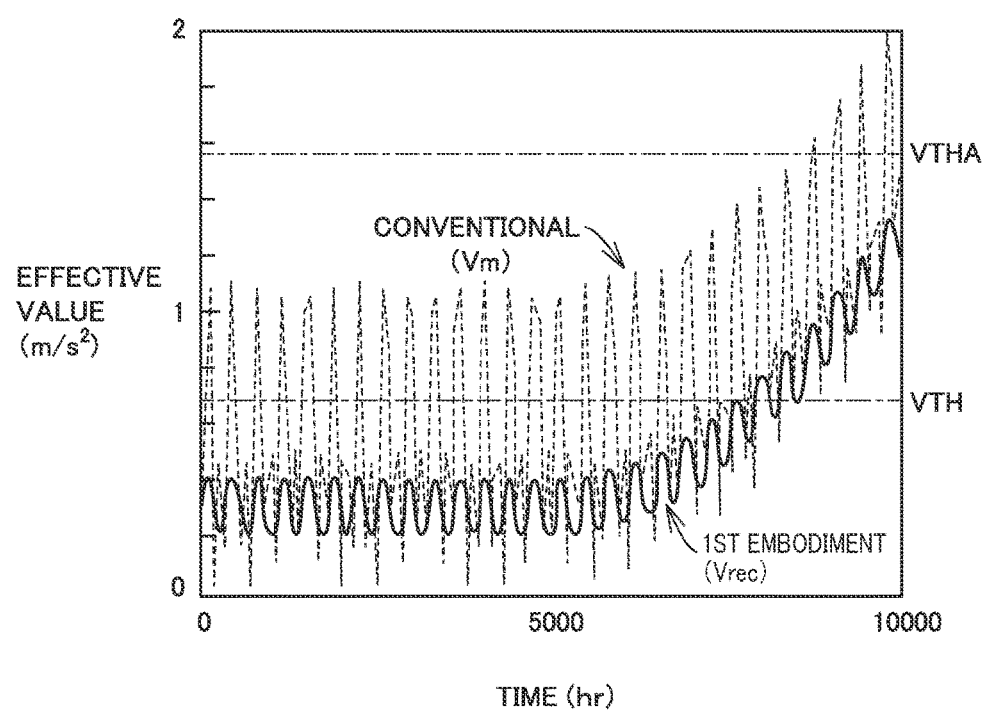
FIG. 7 is a figure for illustrating an effect of the first embodiment.

FIG. 7 shows an effect of the first embodiment. This figure represents a variation of a diagnosis parameter with time (represented by a solid line) and a threshold value VTH in the first embodiment, and, as a comparative example, a variation of a diagnosis parameter calculated regardless of whether main shaft 20 rotates, which corresponds to conventional art, with time (represented by a dotted line) and a threshold value VTHA. Each represented diagnosis parameter is an effective value ($m/s^2$) of a vibrational acceleration of yaw bearing 122 calculated from the measurement data of sensor 70I.

The diagnosis parameter calculated regardless of whether main shaft 20 rotates (represented by the dotted line), even with yaw bearing 122 being normal, varies significantly as the diagnosis parameter receives an effect of rotation of main shaft 20. Threshold value VTHA for determining whether the diagnosis parameter is abnormal needs to be set to a value higher than a peak value of the diagnosis parameter obtained at the normal time, and accordingly, conventionally, it has been set to a relatively high value. As a result, a timing of detecting a failure of yaw bearing 122 tends to be delayed, and accordingly, procuring replacement parts delays and the like, and it is thus also assumed that a period of time for which the wind turbine cannot be operated is extended or the like.

In contrast, in the first embodiment, a period of time in which main shaft 20 does not rotate is defined as an effective period of a diagnosis parameter, and the diagnosis parameter of the effective period is used to perform each process in the learning period and the service period, and accordingly, an increase of a variation of the diagnosis parameter resulting as main shaft 20 rotates is suppressed (as indicated by the solid line). Thus, it is not necessary to make unnecessarily large a setting of a threshold value applied in diagnosing whether yaw bearing 122 has a failure and threshold value VTH can be set to a relatively low value, and accordingly, there is not caused a delay in detecting a failure that is introduced by making the threshold value unnecessarily large. Thus, according to the first embodiment, a failure of yaw bearing 122 can be early detected.

Note that while in the above main shaft 20 stopped from rotating is defined as one yaw bearing diagnosing, operating condition, primarily, a wind turbine is installed in a place having a good wind condition, and main shaft 20 is not so frequently stopped from rotating. Accordingly, when nacelle 90 has rotating angular velocity ω within a non-zero, first prescribed range and main shaft 20 has rotating angular velocity ωm within a non-zero, second prescribed range, a diagnosis parameter of yaw bearing 122 may be measured. This second prescribed range, as well as the first prescribed range, may be designated as a diagnostic operating condition in the basic data collecting period. For example for a wind turbine often operated at 80 to 100% of its rated power, a range of rotating angular velocity tom of main shaft 20 when the wind turbine outputs the above power while nacelle 90 often rotates at rotating angular velocity ω, may be selected as the second prescribed range. And by using a diagnosis parameter obtained when main shaft 20 has rotating angular velocity ωm within the second prescribed range, an effect on the diagnosis parameter accompanying the rotation of main shaft 20 is suppressed. Accordingly, threshold value VTH can be set to an appropriate value, and as a result a failure of yaw bearing 122 can be early detected.

Furthermore, in order to further reduce noise at a time of measurement, power generator 50 generating electric power in an amount within a third prescribed range may further be added to the yaw bearing diagnosing, operating condition. Although it is an example, it is preferable to select rotating angular velocity ωm of main shaft 20 that is an upper limit value of a rated operation and an amount of electric power generated by power generator 50 that is about 60-80% of a rated amount, that is, a relatively highly frequently occurring operating condition.

Second Embodiment

In the above first embodiment, main shaft 20 having rotating angular velocity ωm within a prescribed range (including main shaft 20 being stopped) is defined as a yaw bearing diagnosing, operating condition, and accordingly, when a wind condition (or a wind speed) changes frequently, a diagnosis parameter may insufficiently be collected.

Accordingly, in this second embodiment, a diagnosis parameter collected without imposing a condition on the rotating angular velocity of main shaft 20 is corrected depending on rotating angular velocity ωm of main shaft 20, and a failure of yaw bearing 122 is diagnosed based on the diagnosis parameter an effect of rotation of main shaft 20 on which is suppressed.

The second embodiment provides a condition monitoring system having a general configuration, wind turbine 10 having a configuration, and a diagnosis parameter and a failure mode having a relationship, which are identical to those of the first embodiment.

And in the condition monitoring system according to the second embodiment, a yaw bearing diagnosing diagnosis parameter is corrected based on rotating angular velocity ωm of main shaft 20, as described above. Specifically, when main shaft 20 has higher rotating angular velocity ωm, the measurement data of sensor 70I and a diagnosis parameter based thereon significantly vary. Accordingly, in order to suppress the variation of the diagnosis parameter resulting as main shaft 20 rotates, the diagnosis parameter is corrected so that when main shaft 20 has higher rotating angular velocity ωm, a ratio of the diagnosis parameter after the correction to the diagnosis parameter before the correction is smaller.

(Diagnosis Parameter Correction Process)

The diagnosis parameter correction process is performed in data server 330 (see FIG. 1). Data server 330 receives a sensed value of rotating angular velocity ωm (rad/s) of main shaft 20 from sensor 70K (see FIG. 2), and calculates an average value ωma of rotating angular velocity ωm based on the following expression (3):

$$\omega_{ma} = \frac{1}{T_2 - T_1} \int_{T_1}^{T_2} \overline{\omega}_m(t) dt, \tag{3}$$

where t represents time, and T1 and T2 represent a measurement start time and a measurement end time, respectively, and a time (T2−T1) is set to a predetermined time. The period of time (T2−T1) may be set as appropriate. Furthermore, data server 330 divides value ωma by a maximum value ωmaMax of rotating angular velocity ωm to calculate a dimensionless rotating angular velocity Ω of main shaft 20.

$$\Omega = \left| \frac{\omega_{ma}}{\omega_{maMax}} \right|. \tag{4}$$

Note that maximum value ωmaMax may be a set value of a specification of wind turbine 10, or may be a maximum value of an actually measured value of rotating angular velocity ωm collected in the basic data collecting period.

Figure 8:
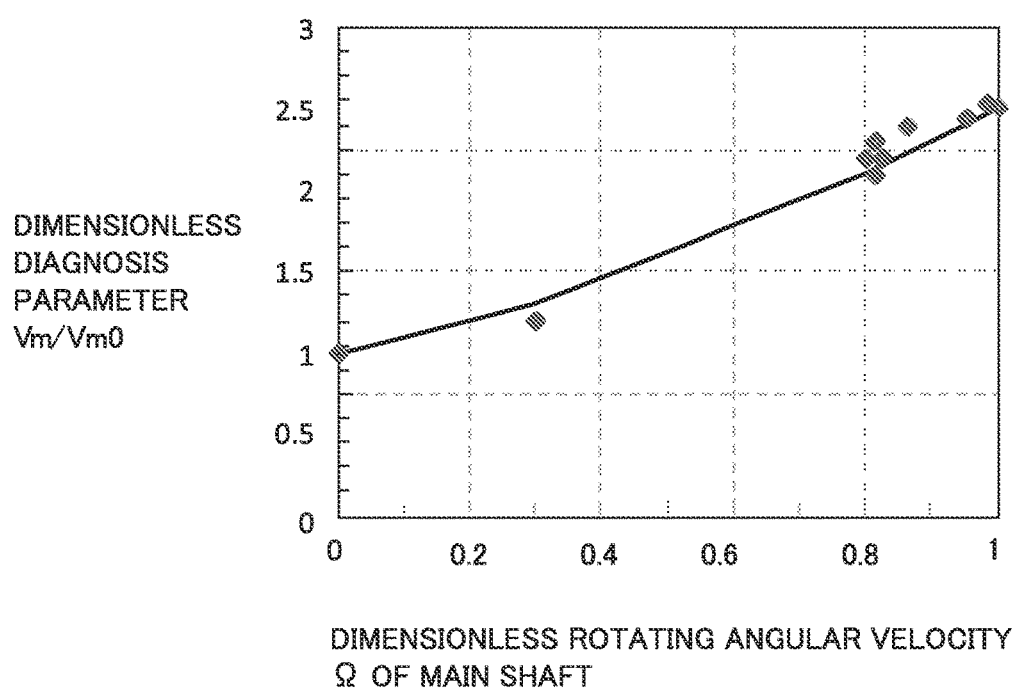
FIG. 8 represents a relationship between a dimensionless diagnosis parameter and a dimensionless rotating angular velocity of a main shaft.

When a dimensionless diagnosis parameter (Vm/Vm0) obtained by dividing a diagnosis parameter Vm calculated from the measurement data of sensor 70I monitoring the condition of yaw bearing 122 by an average value Vm0 of the diagnosis parameter obtained while main shaft 20 does not rotate is marshaled with respect to the above dimensionless rotating angular velocity Ω of main shaft 20, a relationship is observed between the dimensionless diagnosis parameter (Vm/Vm0) and dimensionless rotating angular velocity Ω of main shaft 20, as shown in FIG. 8.

Note that although the average value of the diagnosis parameter obtained while main shaft 20 does not rotate is represented by Vm0, there is also a case where it is rare that main shaft 20 does not rotate and simultaneously nacelle 90 rotates. In such a case, a diagnosis parameter at a rotating angular velocity of main shaft 20 when a wind turbine outputs a rated power, a diagnosis parameter at a rotating angular velocity of main shaft 20 that is highly frequently attained during the basic data collecting period etc., may be selected as Vm0. In any of the cases, a diagnosis parameter at a rotating angular velocity of main shaft 20 determined to serve as a reference may be handled as Vm0. Hereinafter, for ease of understanding, a case will be described assuming that a diagnosis parameter when main shaft 20 does not rotate is Vm0.

FIG. 8 represents a relationship between a dimensionless diagnosis parameter (Vm/Vm0) and dimensionless rotating angular velocity $\Omega$ of main shaft 20. Note that the data shown in this FIG. 8 is data collected when yaw bearing 122 does not have failure, i.e., in a normal operation. With reference to FIG. 8, Vm0 represents a value of diagnosis parameter Vm obtained while main shaft 20 does not rotate, and accordingly, when rotating angular velocity $\Omega$ is 0, dimensionless diagnosis parameter (Vm/Vm0) will have a value of 1. And as rotating angular velocity $\Omega$ increases, the value of dimensionless diagnosis parameter (Vm/Vm0) increases.

FIG. 8 shows an upward tendency of a diagnosis parameter up to a maximum rotating angular velocity ($\Omega$=1) of main shaft 20 with reference to value Vm0 of the diagnosis parameter obtained while main shaft 20 does not rotate. By correcting the diagnosis parameter to remove a variation increment of the diagnosis parameter caused as main shaft 20 rotates, a variation of the diagnosis parameter caused by a failure of yaw bearing 122 can be accurately estimated.

Accordingly, in the condition monitoring system according to the second embodiment, based on the data shown in FIG. 8, an approximation function L (a correction function) is calculated which represents a relationship between a dimensionless diagnosis parameter (Vm/Vm0) and dimensionless rotating angular velocity $\Omega$ of main shaft 20. And by dividing diagnosis parameter Vm by a value of approximation function L (or the correction function) depending on rotating angular velocity $\Omega$ actually measured, the diagnosis parameter is corrected.

This suppresses an effect of rotation of main shaft 20 on the diagnosis parameter, and a threshold value for diagnosing a failure of yaw bearing 122 can be set without considering a variation of a vibration parameter resulting as main shaft 20 rotates. More specifically, it is not necessary to set the threshold value to an unnecessarily large value in consideration of the variation of the vibration parameter resulting as main shaft 20 rotates. This allows the threshold value for the failure diagnosis to be lowered to an appropriate level, and thus allows early failure detection to be done in the failure diagnosis.

Note that a variety of functions can be adopted for approximation function (correction function) L representing the relationship between the dimensionless diagnosis parameter (Vm/Vm0) and dimensionless rotating angular velocity $\Omega$ of main shaft 20. In the second embodiment, the following function Fv($\Omega$) is used as an example.

$$F_V(\Omega) = \frac{V_m}{V_{m0}} = \left(\frac{V_{m1}}{V_{m0}} - 1\right)\Omega^\alpha + 1, \tag{5}$$

where Vm1 represents a value of diagnosis parameter Vm when dimensionless rotating angular velocity $\Omega$ of main shaft 20 is 1 (i.e., $\omega$ma=$\omega$maMax), and $\alpha$ is a constant. Constant $\alpha$ is determined based on an actually measured value of diagnosis parameter Vm, and for example, it is determined based on a regression formula of the data represented in FIG. 8.

And diagnosis parameter Vm is corrected using the correction function represented by an expression (5), as follows:

$$V_{rec} = \frac{V_m}{F_V(\Omega)} = \frac{V_m}{\left(\frac{V_{m1}}{V_{m0}} - 1\right)\Omega^\alpha + 1}. \tag{6}$$

Vrec represents the diagnosis parameter that has been corrected based on rotating angular velocity $\omega$m of main shaft 20. And in the second embodiment, in a process performed when the learning period ends and in the service period, a process for correcting the diagnosis parameter is performed and each process is performed based on corrected diagnosis parameter Vrec.

Figure 9:
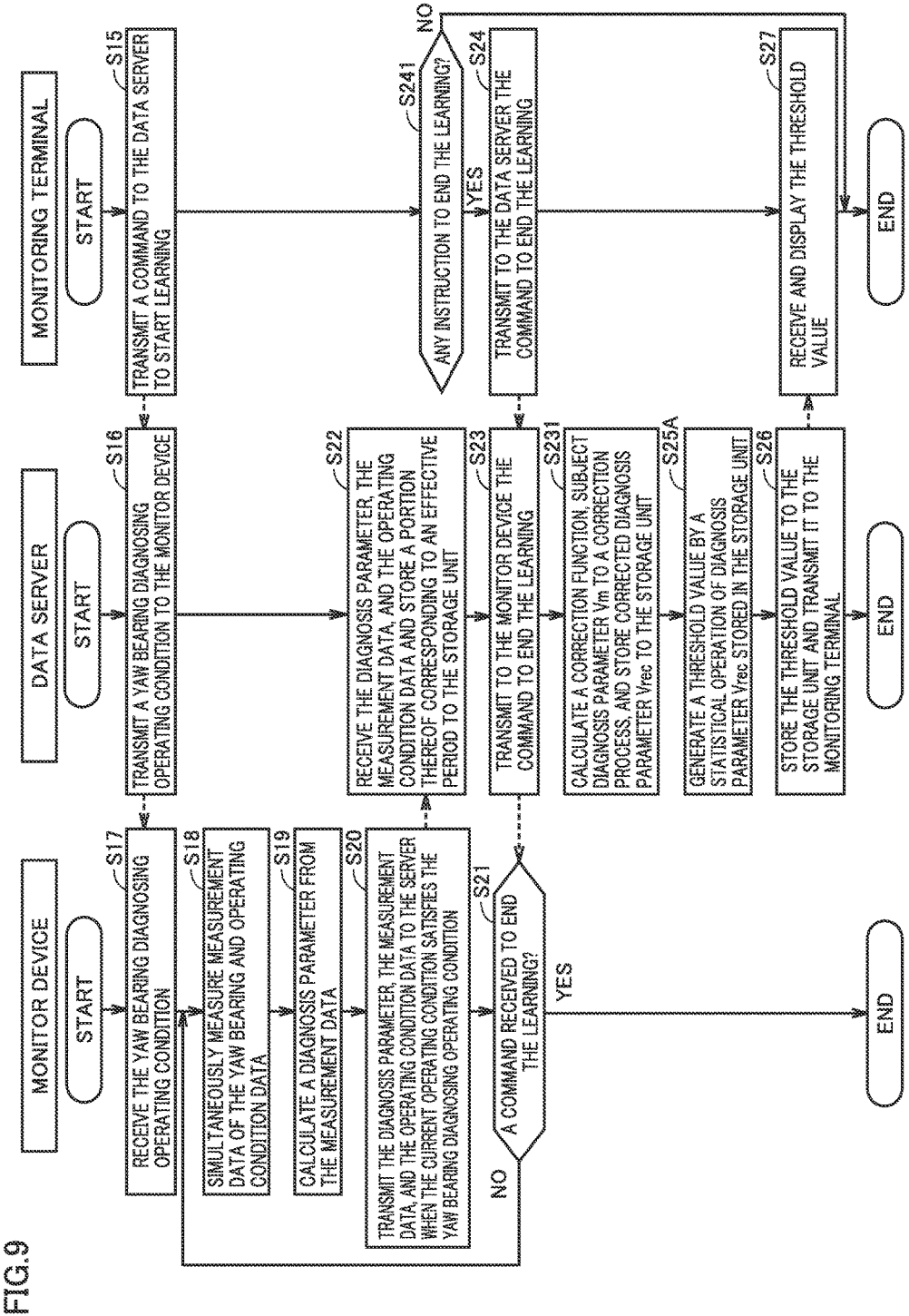
FIG. 9 is a flowchart of an operation of the condition monitoring system in a second embodiment during a learning period.

FIG. 9 is a flowchart of an operation of the condition monitoring system in the second embodiment during a learning period. With reference to FIG. 9, this flowchart corresponds to the flowchart shown in FIG. 5 according to the first embodiment to represent an operation in the learning period, with step S231 further included and steps S22, S25 replaced with steps S22A, S25A, respectively.

In other words, in step S20, when the current operating condition satisfies the yaw bearing diagnosing, operating condition, and monitor device 80 transmits the diagnosis parameter, the measurement data, and the operating condition data to data server 330, data server 330 receives diagnosis parameter Vm, the measurement data, and the operating condition data, and stores them to the storage unit (step S22A).

And when in step S24 a command to end the learning is transmitted from monitoring terminal 340 to data server 330 and in step S23 data server 330 transmits the command to monitor device 80 to end the learning, data server 330 determines correction function Fv($\Omega$) represented by the above expression (5). Specifically, data server 330 determines $\omega$maMax, Vm0, and Vm1 under an operating condition of interest, and finally calculates constant $\alpha$ of the correction function. And data server 330 subjects diagnosis parameter Vm of yaw bearing 122 stored in the storage unit to a correction process according to the above expression (6) to generate corrected diagnosis parameter Vrec and store it to the storage unit (step S231).

Then, by a statistical operation of diagnosis parameter Vrec stored in the storage unit, data server 330 automatically generates a threshold value for the diagnosis parameter (step S25A). Subsequently, the control proceeds to step S26, and the threshold value generated in step S25A is stored to the storage unit of data server 330, and transmitted to monitoring terminal 340.

Figure 10:
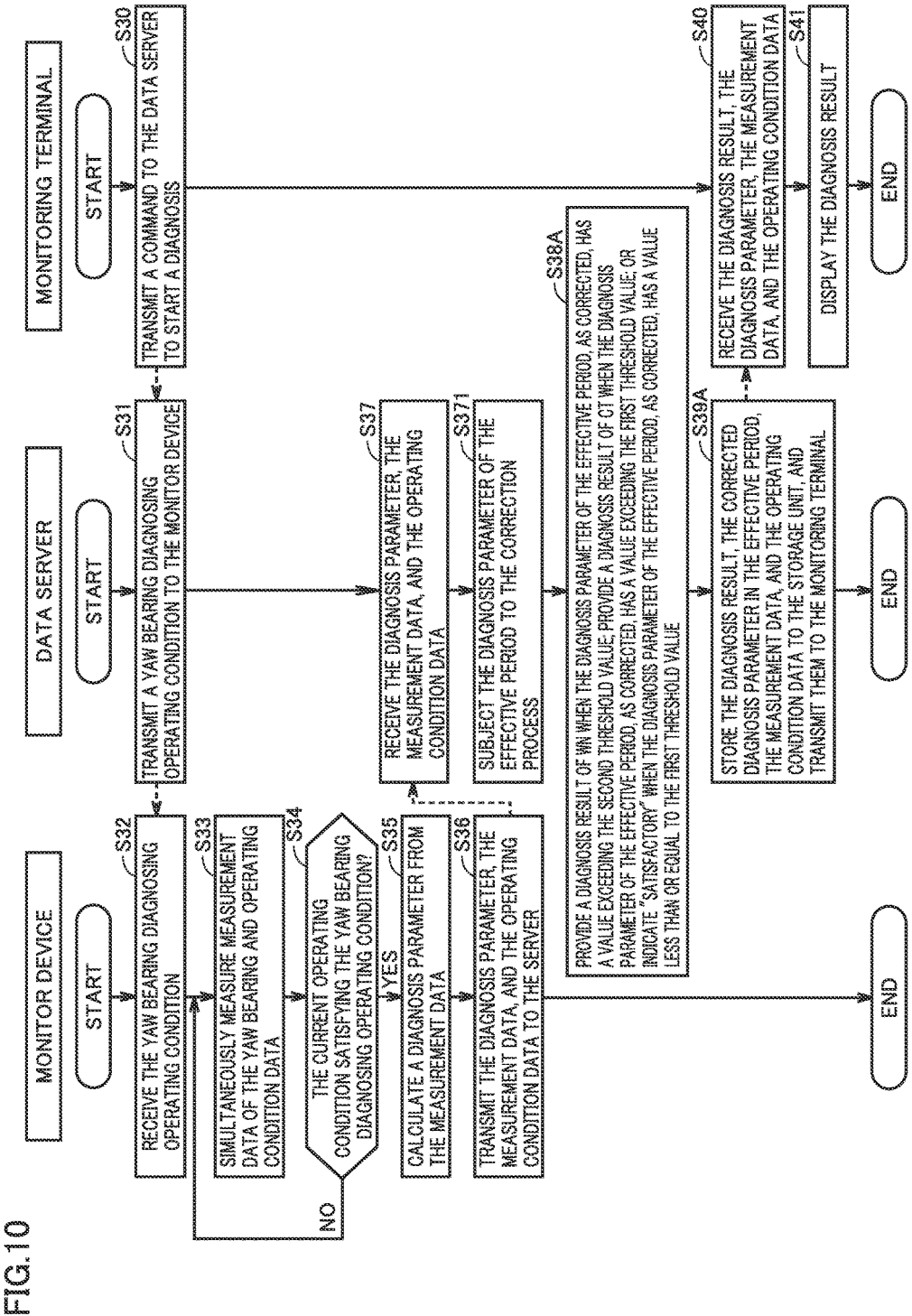
FIG. 10 is a flowchart of an operation of the condition monitoring system in the second embodiment during a service period.

FIG. 10 is a flowchart of an operation of the condition monitoring system in the second embodiment during a service period. With reference to FIG. 10, this flowchart corresponds to the flowchart shown in FIG. 6 according to the first embodiment to represent an operation in the service period, with Steps S37-S39 replaced with Steps S37A-S39A, respectively.

In other words, when in step S34 the current operating condition satisfies the yaw bearing diagnosing, operating condition and subsequently in step S36 monitor device 80 transmits the diagnosis parameter, the measurement data, and the operating condition data to data server 330, data server 330 receives diagnosis parameter Vm, the measurement data, and the operating condition data, and subjects diagnosis parameter Vm to a correction process based on the above expressions (5) and (6) (step S37A).

Data server 330 then determines the condition of yaw bearing 122 based on corrected diagnosis parameter Vrec and a threshold value generated during the learning period. For example, when corrected diagnosis parameter Vrec exceeds second threshold value WN, data server 330 provides a diagnosis result of WN, whereas when corrected diagnosis parameter Vrec exceeds first threshold value CT, data server 330 provides a diagnosis result of CT (step S38A). And data server 330 stores this diagnosis result, corrected diagnosis parameter Vrec, the measurement data, and the operating condition data to the storage unit, and transmits these pieces of data to monitoring terminal 340 (step S39A). Subsequently, the control proceeds to step S40.

According to the second embodiment, an effect similar to that of the first embodiment shown in FIG. 7 is obtained. Again with reference to FIG. 7, when diagnosis parameter Vm is recorded without taking into consideration a variation of measurement data accompanying the rotation of main shaft 20, then, even with yaw bearing 122 being normal, the diagnosis parameter will have a large variation (as represented by the dotted line). Accordingly, threshold value VTHA for determining whether the diagnosis parameter is abnormal needs to be set to a value higher than a peak value of the diagnosis parameter obtained at a normal time, and accordingly, it needs to be set to a relatively high value. Accordingly a timing of detecting a failure of yaw bearing 122 tends to delay.

In contrast, in the second embodiment, diagnosis parameter Vm is corrected based on rotating angular velocity ωm of main shaft 20 and corrected diagnosis parameter Vrec is used to perform each process in the learning period and the service period, and accordingly, an increase of a variation of the diagnosis parameter resulting as main shaft 20 rotates is suppressed (as represented by the solid line). Thus, it is not necessary to make unnecessarily large a setting of a threshold value applied in diagnosing whether yaw bearing 122 has a failure and threshold value VTH can be set to a relatively low value, and accordingly, there is not caused a delay in detecting a failure that is introduced by making the threshold value unnecessarily large.

Furthermore, whether main shaft 20 may be rotated or stopped, a diagnosis parameter can be collected and a failure of yaw bearing 122 can be diagnosed, so that, in this regard also, the failure of yaw bearing 122 can be found further earlier than in the first embodiment.

Third Embodiment

While in the second embodiment, a diagnosis parameter of yaw bearing 122 is corrected depending on rotating angular velocity ωm of main shaft 20, the diagnosis parameter may be corrected depending on an amount of electric power generated by power generator 50, rather than rotating angular velocity ωm of main shaft 20. In other words, variation in amount of electric power generated is ganged with that of transmission torque acting on speed up gear 40, and also manifests as variation of vibration in a vicinity of yaw bearing 122. Accordingly, in a third embodiment, a diagnosis parameter of yaw bearing 122 is corrected depending on an amount of electric power generated by power generator 50.

Correcting the diagnosis parameter depending on the amount of electric power generated by power generator 50 can be done in a methodology similar to that of the second embodiment. In other words, from an average value of the amount of electric power generated by power generator 50 and a maximal value thereof, an amount of dimensionless power generation Ω can be calculated following the above expression (4), and from a relationship between dimensionless diagnosis parameter Vm/Vm0 and amount of dimensionless power generation Ω, correction function Fv(Ω) can be calculated by following the above expression (5). And corrected diagnosis parameter Vrec can be calculated using the above expression (6).

Note that when rotating angular velocity ωm of main shaft 20 reaches the upper limit, blade 30 has a pitch angle varied to increase rotation torque to generate electric power in an increased amount. Accordingly, before rotating angular velocity ωm of main shaft 20 reaches the upper limit value, the diagnosis parameter may be corrected depending on the rotating angular velocity of main shaft 20, and once rotating angular velocity ωm of main shaft 20 has reached the upper limit, the correction depending on the amount of electric power generated by power generator 50 as described above may further be added.

In that case the diagnosis parameter is corrected according an expression represented for example as follows:

$$V_{rec} = \frac{V_m}{F_V(\Omega) F_P(\Pi)}, \quad (7)$$

$$F_P(\Pi) = \begin{cases} 1 & (\Omega < 1) \\ \left(\frac{V_{mp1}}{V_{mp0}} - 1\right)\Pi^\beta + 1 & (\Omega = 1) \end{cases}, \quad (8)$$

$$\Pi = \begin{cases} 0 & (\Omega < 1) \\ \frac{P_m - P_{mMin}}{P_{mMax} - P_{mMin}} & (\Omega = 1) \end{cases}, \quad (9)$$

where Π represents an amount of dimensionless power generation by power generator 50, and Fp(Π) is a correction function depending on amount of dimensionless power generation Π. Furthermore, Vmp0 represents an average value of diagnosis parameter Vm for Ω=1 and amount of dimensionless power generation Π of 0, and Vmp1 represents an average value of diagnosis parameter Vm for Ω=1 and amount of dimensionless power generation Π having reached 1. Furthermore, Pm represents an average value of an amount of electric power generated for a time of interest, and PmMax and PmMin represent maximum and minimum amounts, respectively, of electric power generated for Ω=1.

According to the third embodiment, by correcting diagnosis parameter Vm of yaw bearing 122, as described above, a noise by a variation of an amount P of electric power generated by power generator 50 can further be suppressed and yaw bearing 122 can be diagnosed further more precisely.

Note that while in each of the above embodiments, sensor 70I is provided in a vicinity of yaw bearing 122 and a diagnosis parameter is calculated from measurement data of sensor 70I to diagnose a condition of yaw bearing 122, the sensor used for diagnosing yaw bearing 122 is not limited thereto. For example, yaw bearing 122 may be diagnosed by using a diagnosis parameter calculated from measurement data of sensor 70A which monitors the condition of main shaft bearing 60, sensor 70B which monitors the condition of speed up gear 40, sensor 70E which monitors the condition of power generator 50, and the like.

Furthermore, while in each above embodiment sensor 70J including a gyro sensor senses rotating angular velocity ω of nacelle 90 and whether nacelle 90 is rotating is determined based on the sensed result, this is not exclusive, and rotating angular velocity ω of nacelle 90 may be sensed by any means.

For example, an azimuth sensor which measures terrestrial magnetism may be used to measure variation in azimuth with time and an azimuthal angle may be differentiated by time to obtain rotating angular velocity ω of nacelle 90.

Furthermore, a GPS (Global Positioning System) sensor which measures a position by utilizing a satellite may be used. Two GPS sensors spaced by a prescribed distance may be provided to nacelle 90 to obtain the azimuth of nacelle 90 from the relative positions of the two GPS sensors, and the azimuth may be differentiated by time to obtain rotating angular velocity ω of nacelle 90.

Furthermore, a single GPS sensor may be used to record a locus of nacelle 90 when it rotates once, and the recorded locus and the current positional information may be used to calculate an azimuthal angle of nacelle 90, which may in turn be differentiated by time to obtain rotating angular velocity ω.

Furthermore, a video recorder may be used to record a scenery around nacelle 90, and from how the scenery changes, rotating angular velocity ω may be obtained.

Furthermore, at least one of a driving current and a driving voltage of drive device 124 for rotating nacelle 90 may be measured and the measured value may be used to calculate rotating angular velocity ω of nacelle 90.

Furthermore, a contactless displacement gage may be used to measure rotation of a gear for rotating nacelle 90 and the measured value may be used to calculate rotating angular velocity ω of nacelle 90.

Furthermore, information from SCADA (Supervisory Control and Data Acquisition) which separately monitors the wind turbine may be used to obtain rotating angular velocity ω of nacelle 90.

Note that while in each above embodiment a threshold value for diagnosing whether yaw bearing 122 has a failure is generated during the learning period, such a learning period as described above may be dispensed with and a threshold value may separately be set based on a diagnosis parameter obtained through an experiment etc. In other words, it is not a requirement to generate the threshold value automatically in the learning period, and a diagnosis parameter obtained through an experiment etc. may be used to therefrom derive the above expressions (5) and (6) and expression (6) may be used to calculate corrected diagnosis parameter Vrec, and threshold value VTH may be determined based thereon.

Note that in each above embodiment, sensor 70I corresponds to one embodiment of a "first detector" in the present invention, and sensor 70J corresponds to one embodiment of a "second detector" in the present invention. Furthermore, sensor 70K corresponds to one embodiment of a "third detector" in the present invention, and data server 330 corresponds to one embodiment of a "controller" in the present invention.

Using each disclosed embodiment in combination as appropriate is also planned. It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

10: wind turbine; 20: main shaft; 30: blade; 40: speed up gear; 50: power generator; 60 main shaft bearing; 70A-70K: sensor; 80: monitor device; 90: nacelle; 100: tower; 122: yaw bearing; 124: drive device; 126: ring gear; 320: internet; 330: data server; 340: monitoring terminal.

The invention claimed is:

1. A condition monitoring system configured to monitor a condition of equipment included in a wind turbine, the wind turbine including: a blade for converting wind power to rotation torque; a main shaft receiving the rotation torque; a power generator converting the rotation torque into electric power; a nacelle provided on top of a tower and housing the main shaft and the power generator therein; and a yaw bearing turnably supporting the nacelle on the top of the tower, the condition monitoring system comprising:
   a first detector configured to detect the condition of the equipment;
   a monitor device configured to generate a diagnosis parameter based on a detection result of the first detector;
   a controller configured to diagnose a failure of the equipment based on the diagnosis parameter;
   a second detector configured to detect a rotation speed of the nacelle; and
   a third detector configured to detect a rotation speed of the main shaft,
   the controller being configured to diagnose whether the yaw bearing has a failure, based on a variation of the diagnosis parameter from an initial value thereof when the nacelle has a rotation speed within a first prescribed range excluding zero and when the main shaft has a rotation speed within a second prescribed range.

2. The condition monitoring system according to claim 1, wherein the controller is configured to diagnose whether the yaw bearing has a failure, based on a variation of the diagnosis parameter from an initial value thereof when the nacelle has a rotation speed within the first prescribed range and when the main shaft has a rotation speed of substantially zero.

3. The condition monitoring system according to claim 1, wherein the controller is further configured to:
   (i) correct the diagnosis parameter based on a detection result of the third detector obtained when the nacelle has a rotation speed within the first prescribed range, and
   (ii) diagnose whether the yaw bearing has a failure based on a variation of the corrected diagnosis parameter from an initial value thereof.

4. The condition monitoring system according to claim 3, wherein:
   the controller is configured to correct the diagnosis parameter by using a first correction function with a rotation speed of the main shaft used as a variable; and
   the first correction function is a function which corrects the diagnosis parameter so that as the main shaft has a higher rotation speed, a ratio of the diagnosis parameter after the correction to the diagnosis parameter before the correction is smaller.

5. The condition monitoring system according to claim 4, wherein the first correction function is a function of a dimensionless diagnosis parameter obtained by dividing the diagnosis parameter by a diagnosis parameter obtained while the main shaft does not rotate, and the first correction function uses as the variable a dimensionless rotation speed of the main shaft obtained by dividing a rotation speed of the main shaft by a maximum speed thereof.

6. The condition monitoring system according to claim 4, wherein the controller is configured to calculate an average value of a rotation speed of the main shaft in a prescribed period before the diagnosis, and correct a diagnosis parameter using the first correction function based on the average value.

7. The condition monitoring system according to claim 4, wherein:

the controller is further configured to correct the diagnosis parameter by using a second correction function using as a variable an amount of electric power generated by the power generator; and the second correction function is a function which corrects the diagnosis parameter so that as the power generator generates a larger amount of electric power, a ratio of the diagnosis parameter after the correction by the second correction function to the diagnosis parameter before the correction by the second correction function is smaller.

8. The condition monitoring system according to claim 7, wherein only when a rotation speed of the main shaft reaches an upper limit, the controller is further configured to correct the diagnosis parameter by using the second correction function.

9. The condition monitoring system according to claim 1, wherein the first detector is provided in a vicinity of the yaw bearing and detects a condition of the yaw bearing.

10. The condition monitoring system according to claim 1, wherein the controller is configured to diagnose the failure of the equipment, based on the diagnosis parameter obtained when a rotation speed of the nacelle obtained from information from SCADA (Supervisory Control and Data Acquisition) falls within the first prescribed range, the SCADA separately monitoring the wind turbine.

11. The condition monitoring system according to claim 1, wherein the second detector includes an azimuth sensor.

12. The condition monitoring system according to claim 1, wherein the second detector includes a gyro sensor.

13. The condition monitoring system according to claim 1, wherein the second detector includes a GPS (Global Positioning System).

14. The condition monitoring system according to claim 1, wherein the second detector includes a detector to detect at least one of a driving current and a driving voltage of a drive device driving the nacelle.

15. A wind power generation system comprising:
a wind turbine; and
the condition monitoring system according to claim 1.

* * * * *